United States Patent

[11] 3,555,359

| [72] | Inventors | Alton R. Morris<br>Trumbull;<br>Thomas M. McDonald, Monroe, Conn. |
|---|---|---|
| [21] | Appl. No. | 658,853 |
| [22] | Filed | Aug. 7, 1967 |
| [45] | Patented | Jan. 12, 1971 |
| [73] | Assignee | Harvey Habbell, Incorporated<br>Bridgeport, Conn.<br>a corporation of Connecticut |

[54] CIRCUIT PROTECTIVE DEVICE
6 Claims, 3 Drawing Figs.

[52] U.S. Cl. .................................... 317/18,
317/27, 317/33
[51] Int. Cl. ...................................... H02h 1/02
[50] Field of Search........................... 317/18, 27, 31, 33

[56] References Cited
UNITED STATES PATENTS

| 3,187,225 | 6/1965 | Mayer ......................... | |
| 3,213,321 | 10/1965 | Dalziel ........................ | 317/18 |
| 3,296,493 | 1/1967 | Whittaker et al. ............. | 317/18 |
| 3,345,539 | 10/1967 | Ashenden et al. ............. | 317/27X |

*Primary Examiner*—William M. Shoop, Jr.
*Attorney*—Wooster, Davis & Cifelli

ABSTRACT: A device for detecting unbalanced current flow in the conductors of a power supply circuit and deenergizing the circuit upon predetermined conditions of unbalance. A differential transformer is employed which has a multiple-turn secondary winding, the primary windings being formed by the conductors of the power supply circuit. The output from the differential transformer controls the current flow through a detector transistor. A reference transistor, similar to the detector transistor, is connected so that its current flow is controlled by external means. The voltages produced by the current flows through the two transistors are compared by a comparator circuit which produces a tripping signal upon a predetermined unbalance of the currents. Circuit breaker means in the power supply circuit is responsive to the tripping signal to deenergize the load. By employing two transistors, common temperature effects are substantially canceled out.

CIRCUIT PROTECTIVE DEVICE

BACKGROUND OF THE INVENTION

One of the newest developments in the field of electrical circuit protection is the ground leakage detector. This is a device which monitors the sum of the currents flowing in the conductors between a power supply and a load. Under normal conditions, of course, these currents must add to zero. Older devices, such as fuses and overload circuit breakers, were designed to interrupt the circuit whenever the current flow reached an excessive value -- such as might exist, for example, under short circuit or low resistance ground conditions. However, they were not sufficiently sensitive to deenergize the circuit in the presence of a relatively high resistance ground. Under many circumstances, these devices would remain inoperative, even under conditions that were hazardous to human life. For example, they could permit a lethal current to flow from the hot wire through a human body to ground without ever deenergizing the circuit.

With the advent of the ground leakage detector, it became possible to interrupt the circuit whenever potentially dangerous conditions occurred Essentially, these devices comprised differential transformers having a single magnetic core through which the circuit conductors were passed. For example, in a single phase system, both line and neutral conductor would pass through the core, thus forming single turn primaries. Alternatively, a relatively few number of primary turns might be provided on the core. A multiple turn secondary winding was also provided. When the currents in the line and neutral conductors were the same, they produced equal and opposite magnetic flux in the core which canceled and produced no output at the secondary winding. However, whenever an imbalance occurred such as might result, for example, from current passing from the line conductor through a human body to ground, the currents in the primaries would be unequal and a resultant flux would be produced in the core. This, in turn would produce a voltage on the secondary winding. This voltage was sensed by a semiconductor device, such as a transistor or a silicon controlled rectifier, and was utilized to trip a relay in the supply circuit.

While devices of the foregoing type are highly sensitive and are a distinct improvement over the prior art, certain problems still remain. These problems arise from the use of semiconductor devices which are inherently temperature sensitive. For example, it might be desired that the protective device be actuated when the differential current is 5 ma. but not when the differential current is only 4 ma. Assuming that the device is so adjusted, it will remain stable so long as the temperature remains constant. However, with an increase in temperature, the operating point of the semiconductor will change so that it will operate to deactivate the circuit on a differential current of 4 ma.

SUMMARY OF THE INVENTION

It is the primary object of the present invention to provide an improved differential current protective device utilizing semiconductors wherein the device is substantially insensitive to temperature changes. This is accomplished by providing two semiconductors, one responsive to the output of the differential transformer, the other responsive to a preselected reference. The outputs of both semiconductors are applied to a comparison circuit which activates the tripping device only when the outputs of the two semiconductors exceed a preselected differential. As the two semiconductor devices are exposed to essentially the same temperature environment, it will be immediately apparent that any change in this environment is reflected equally in the response of both semiconductors so that the temperature effects are substantially self-cancelling.

BRIEF DESCRIPTION OF THE DRAWINGS

The invention may be best understood by reference to the drawings wherein.

DESCRIPTION OF THE PREFERRED EMBODIMENTS

Figure 1:
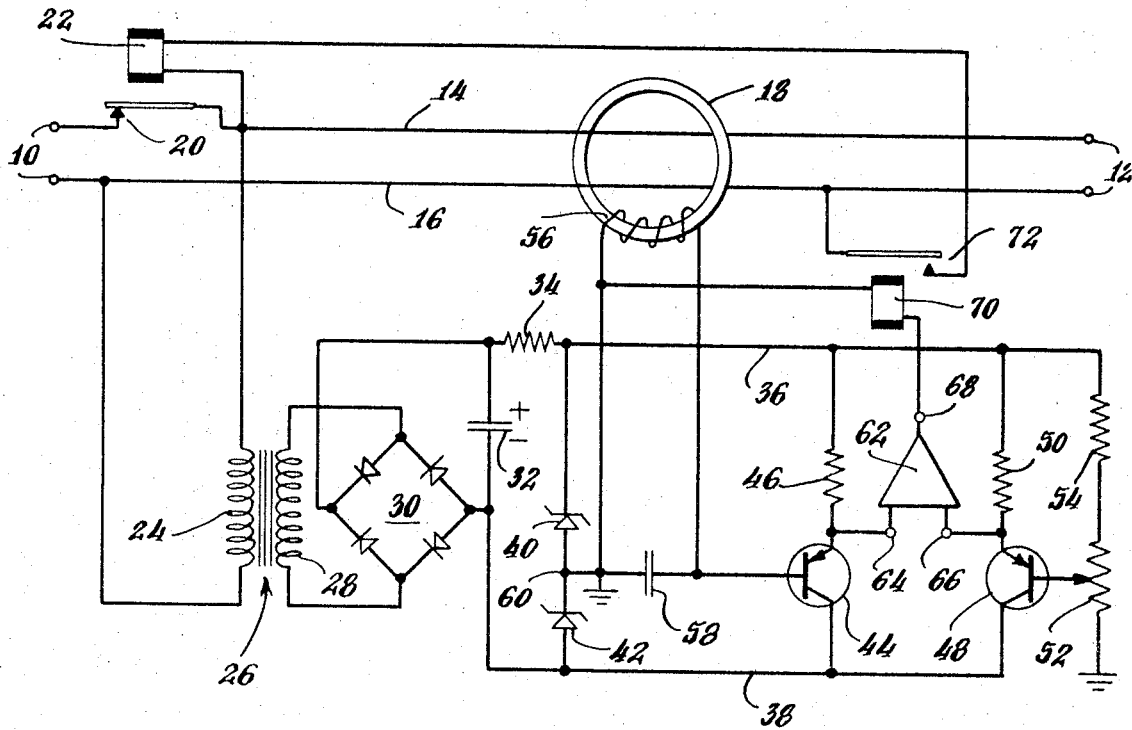
FIG. 1 illustrates a protective circuit device in accordance with the present invention.

With particular reference to FIG. 1, there is illustrated a circuit in accordance with this invention including supply terminals 10 for connection to an alternating current power supply and load terminals 12 for connection to a load to be protected. The supply and load terminals are connected by a line conductor 14 and a ground neutral conductor 16, both conductors passing through the toroidal core 18 of a differential transformer. Positioned in the line conductor 14 is a circuit interrupter comprising a normally closed breaker 20 actuated by a relay coil 22, one end of relay coil 22 being connected to the line conductor 14.

Connected across the line and neutral conductors is the primary winding 24 of a transformer 26. The secondary winding 28 of transformer 26 supplies a full wave rectifier 30, the output of which is connected across a smoothing capacitor 32. The positive side of smoothing capacitor 32 is connected through a current limiting resistor 34 to a positive bus 36. The other side of the smoothing capacitor is connected to a negative bus 38. Connected in series between the positive and negative buses are a 12 volt breakover diode 40 and a 6 volt breakover diode 42. Two identical PNP transistors are employed in the circuit of this invention. One of these may be termed the detector transistor 44 and is connected with its emitter-collector circuit in series with a resistor 46 between positive bus 36 and negative bus 38. The other transistor is reference transistor 48 which is similarly connected in series with resistor 50 between the positive and negative buses. The input to the base of reference transistor 48 is derived from the movable tap of a potentiometer 52 which is connected in series with a resistor 54 between a circuit ground and positive bus 36. The input to the base of detector transistor 44 is derived from the secondary winding 56 on the core 18 of the differential transformer. This output is applied across capacitor 58 which, in turn, is connected between the base of detector transistor 44 and the connecting point 60 between breakover diodes 40, 42 which is also a circuit ground. The voltage developed at the emitter of each of the detector transistor 44 and the reference transistor 48 is applied to the input of a voltage comparator circuit 62 through its input terminals 64, 66. This circuit will be described in more detail below. The output terminal 68 of comparator circuit 62 is connected to circuit ground through the coil 70 of a magnetic latching reed relay. Relay coil 70 operates a normally open reed contact 72 which is connected in series with relay coil 22 between conductors 14, 16.

Figure 3:
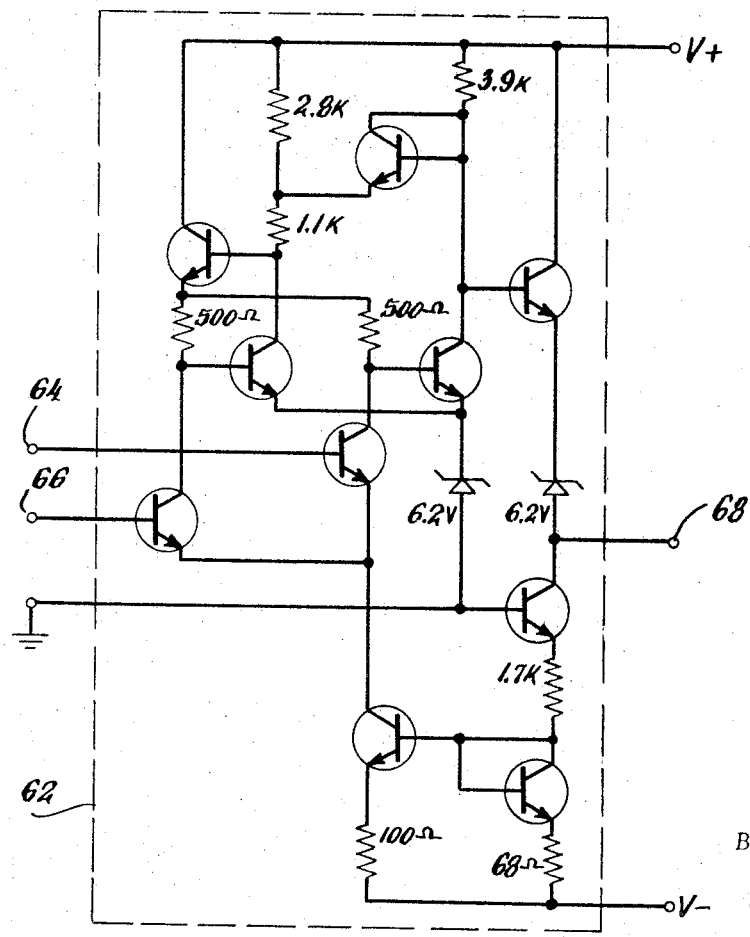
FIG. 3 illustrates one form of voltage comparator which may be employed in the circuits of FIG. 1 or FIG. 2.

It will be understood by those skilled in the art that voltage comparator 62 may be any of a number of circuits or devices which produce a given output in response to a given differential input. Circuits of this nature are commonly used in the computer arts, for example. One such circuit which has been found to be usable in the present invention is the μA710C manufactured by Fairchild Semiconductor Division of Fairchild Camera and Instrument Corporation. The circuit of this device is illustrated in FIG. 3. The input terminals 64, 66 and the output terminal 68 are those previously described in FIG. 1. The characteristics of this circuit are such that, whenever the input voltage at terminal 64 exceeds the input voltage at terminal 66, an output voltage of +3 volts is produced at terminal 68. On the other hand, whenever the voltage at terminal 66 exceeds that at terminal 64, the output voltage at terminal 68 is −0.5 volt.

Turning now to the operation of the circuit of FIG. 1, it will be noted that transistor 44 serves to match the impedance of the differential transformer to the comparator circuit 62.

Transistor 48 serves to compensate for temperature variations of transistor 44. When the currents in conductors 14 and 16 are balanced, there will be no output from secondary winding 56. Therefore, terminal 66 will be positive with respect to terminal 64 and the output at terminal 68 will be −0.5 volt. This potential is not sufficient to energize relay coil 70 and its normally open contact 72 remains open and breaker 20 remains closed.

Assuming, now, an unbalanced condition between the currents in conductors 14 and 16, a potential will be generated by secondary winding 56. When this output reduces conduction through transistor 44, the voltage at terminal 64 will rise. When the voltage at terminal 64 exceeds the voltage at terminal 66, the comparator 62 will have at its output terminal 68 a voltage of +3 volts. This output will be adequate to energize relay coil 70, closing contact 72. As contact 72 closes, it, in turn, energizes relay coil 22 which opens breaker 20, removing all power from the load terminals 12. Once the cause of the unbalance is removed, the circuit can be reset and normal operation resumed.

It will be noted that the output of the secondary winding 56 is AC and that power will be supplied to relay coil 70 on alternate half cycles. In one embodiment of this circuit the relay coil 70 will operate contact 72 in approximately 1 ms. Therefore, the output of the differential transformer need only exceed the reference voltage for this period of time.

While it will be recognized by those skilled in the art that the circuit of FIG. 1 may be subject to considerable modification, in one embodiment the following component values were employed:

| | | |
|---|---|---|
| Secondary winding 56 | turns | 1300 |
| Transformer 26 | stepdown | 4:1 |
| Diodes of rectifier 30 | | 1N4004 |
| Capacitor 32 | mf | 50 |
| Resistor 34 | ohms | 680 |
| Capacitor 58 | mf | .047 |
| Resistors 46, 50 | ohms | 68,000 |
| Transistors 44, 48 | | S1310 |
| Resistor 54 | ohms | 4,700 |
| Potentiometer 52 | do | 2,000 |

Figure 2:
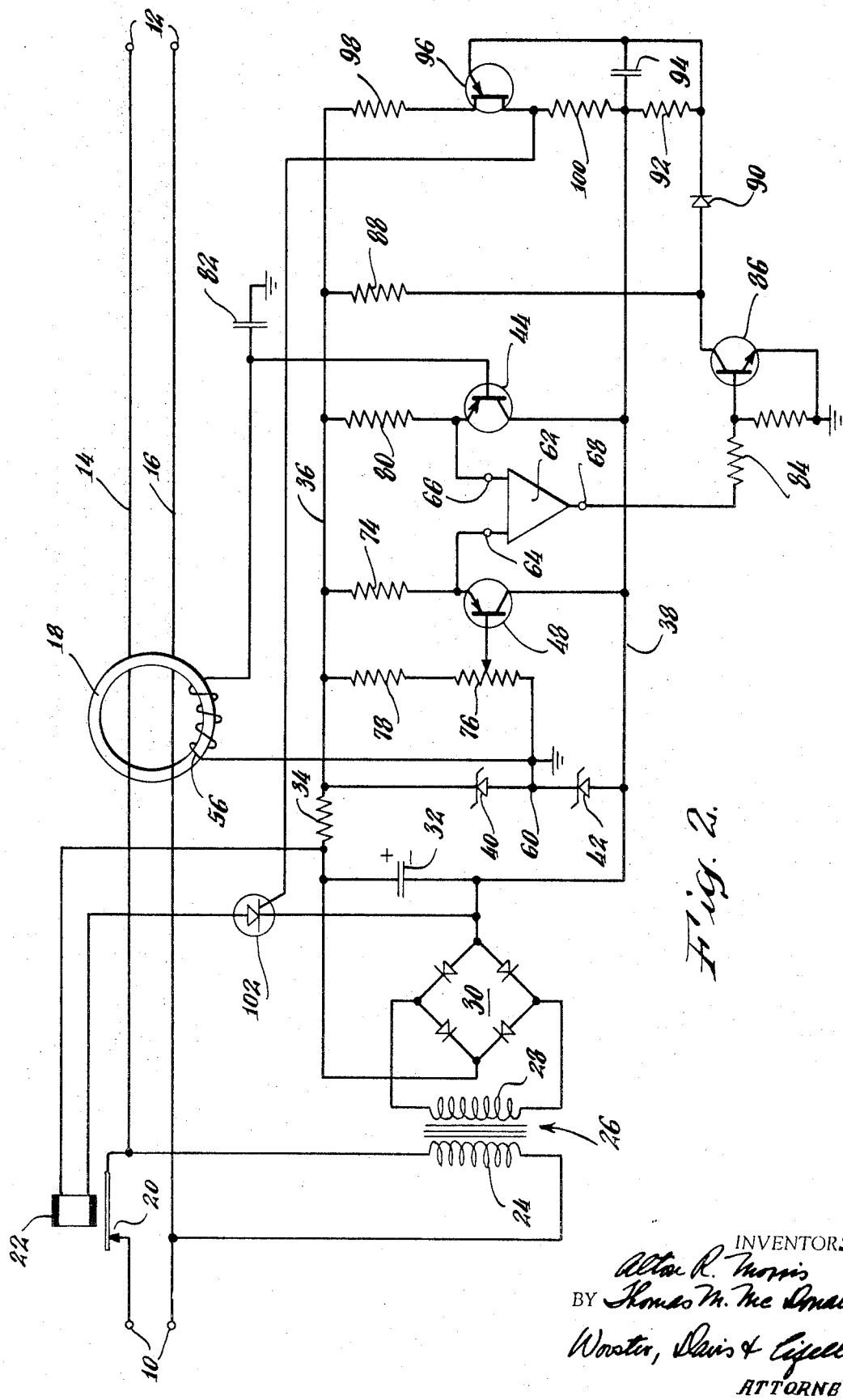
FIG. 2 illustrates a modified version of the circuit of FIG. 1.

In FIG. 2 there is illustrated a modified version of the circuit of FIG. 1. In many respects, the circuit of FIG. 2 is similar to that of FIG. 1 and, where possible, similar reference numerals are employed. However, there are some important distinctions. For example, the detector transistor 44 and the reference transistor 48 are reversed with respect to the input terminals 64, 66 of the voltage comparator circuit 62. The collector-emitter circuit of the reference transistor 48 is connected in series with a resistor 74 between the positive bus 36 and the negative bus 38. The base of transistor 48 is connected to the movable tap of a potentiometer 76 connected in series with a resistor 78 between the positive bus 36 and circuit ground. The collector-emitter circuit of the detector transistor 44 is connected in series with a resistor 80 between the positive and negative buses and its base is connected to the secondary winding 56 of the differential transformer and to a surge protection capacitor 82. The output terminal 68 of the voltage comparator circuit 62 is connected through a resistor 84 to the base of an NPN transistor 86. The collector-emitter circuit of transistor 86 is connected in series between circuit ground and positive bus 36 through resistor 88. The collector is also connected to a diode 90. The diode 90 is connected to a resistor 92, an integrating capacitor 94, and the emitter of a unijunction transistor 96. The other terminals of the resistor 92 and integrating capacitor 94 are connected to the negative bus 38. The base 1, base 2 terminals of unijunction transistor 96 are connected in series with resistors 98 and 100 between the positive and negative buses. The base 1 terminal of unijunction transistor 96 is connected to the gate of a silicon controlled rectifier 102 which is in series with the relay coil 22 and connected to the negative bus 38.

To understand the operation of the circuit of FIG. 2, first assume that there is no differential in the current flow in conductors 14, 16 so that the output of the secondary winding 56 is zero. Under these conditions, the movable tap of potentiometer 76 is adjusted so that reference transistor 48 is nonconductive and a positive potential exists at terminal 64. As the potential at terminal 64 is more positive than that at terminal 66, the output terminal 68 will be at +3 volts. This voltage, applied to the base of transistor 86 will cause this transistor to be conductive, substantially bypassing integrating capacitor 94 and permitting it to charge to only approximately 5.7 volts. This voltage is across the emitter-base 1 terminals of unijunction transistor 96 but is not great enough to cause the unijunction transistor to go into its low impedance state. Accordingly, the silicon controlled rectifier 102 remains in its high impedance state and the coil 22 is not energized.

Assuming a current differential between conductors 14 and 16, a potential will appear across the secondary winding 56 which is applied to the base of detector transistor 44. This causes the transistor to become less conductive and the voltage on terminal 66 to exceed that of terminal 64. The output terminal 68 thereupon changes to a voltage of −0.5 volt. This negative potential, applied to the base of transistor 86, renders this transistor substantially nonconductive and integrating capacitor 94 begins to charge through resistor 88 and diode 90. As soon as the potential across capacitor 94 exceeds the value required to cause the unijunction transistor 96 to go into its low impedance state, a potential will appear across resistor 100 and, accordingly, across the gate-cathode circuit of silicon controlled rectifier 102. This triggers the silicon controlled rectifier into its high conductance state, energizing relay coil 22 and opening the breaker 20.

It will be noted that one of the primary advantages of the circuit of FIG. 2 resides in the use of the integrating capacitor 94. As the capacitor charges in steps, this circuit will not detect differential currents of very short durations, such as transients. Furthermore, it will also be readily apparent that the speed at which the circuit operates is proportional to the amplitude of the differential current, the greater the amplitude, the fewer cycles required to charge capacitor 94 to a tripping voltage.

It will be obvious to those skilled in the art that a number of variations may be made in this invention without departing from its spirit and scope. Accordingly, it is to be understood that the foregoing description is illustrative only, rather than limiting.

We claim:

1. A circuit protective device which comprises: a first solid state current control device responsive to current unbalance in at least two conductors of a protected circuit to produce a first electrical signal proportional thereto; a second solid state current control device for producing a second electrical signal substantially independent of said first signal; means for comparing said first and second electrical signals to produce an output signal responsive to a differential relationship therebetween; and means responsive to said output signal to interrupt said protected circuit at a preselected value of said output signal.

2. The device of claim 1 wherein said current control devices are transistors.

3. A circuit protective device which comprises: a differential transformer; a transistor having its base connected to the secondary winding of said differential transformer, said differential transformer and transistor being responsive to current unbalance in at least two conductors of a protected circuit to produce a first electrical signal proportional thereto; means for producing a second electrical signal substantially independent of said first signal; means for comparing said first and second electrical signals to produce an output signal responsive to a differential relationship therebetween; and means responsive to said output signal to interrupt said protected circuit at a preselected value of said output signal.

4. A circuit protective device which comprises: means responsive to current unbalance in at least two conductors of a protected circuit to produce a first electrical signal proportional thereto; means for producing a second electrical signal substantially independent of said first signal; means for comparing said first and second electrical signals to produce an output signal responsive to a differential relationship therebetween; an integrating capacitor connected to be charged in response to said output signal; and relay means responsive to the charge on said integrating capacitor to open at least one of said conductors at a preselected value of said output signal.

5. A circuit protective device which comprises: means responsive to current unbalance in at least two conductors of a protected circuit to produce an electrical error signal proportional thereto; a DC power supply; a detector transistor having its emitter-collector circuits across said power supply; means applying said electrical error signal to the base of said detector transistor; a reference transistor having its emitter-collector circuit across said power supply; means applying a reference signal to the base of said reference transistor, whereby current flow through the emitter-collector circuits of the respective detector and reference transistors establishes first and second electrical signals; means for comparing said first and second electrical signals to produce an output signal responsive to a differential relationship therebetween; and means responsive to said output signal to interrupt said protected circuit at a preselected value of said output signal.

6. The device of claim 5 wherein said means responsive to current unbalance comprises a differential transformer.